United States Patent
Kurata

(10) Patent No.: US 8,077,344 B2
(45) Date of Patent: Dec. 13, 2011

(54) PRINT CONTROLLING APPARATUS AND METHOD OF CONTROLLING THE SAME

(75) Inventor: Yasuo Kurata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 12/053,205

(22) Filed: Mar. 21, 2008

(65) Prior Publication Data

US 2008/0231901 A1  Sep. 25, 2008

(30) Foreign Application Priority Data

Mar. 23, 2007 (JP) ................. 2007-076403

(51) Int. Cl.
*G06K 15/00* (2006.01)
*G06F 3/12* (2006.01)

(52) U.S. Cl. .............. 358/1.18; 358/1.15; 358/1.13

(58) Field of Classification Search ............. 358/1.16, 358/1.17, 1.18, 1.15, 1.13, 1.1, 1.2, 1.5, 1.11, 358/450, 448, 443; 399/1, 8; 347/2, 3, 5, 347/14, 23; 715/200, 234, 235, 243, 246, 715/273, 274, 277
See application file for complete search history.

(56) References Cited

U.S. PATENT DOCUMENTS

| 7,889,385 B2 * | 2/2011 | Toda ................. 358/1.9 |
| 2005/0168775 A1 * | 8/2005 | Liu ................. 358/1.15 |
| 2010/0039668 A1 * | 2/2010 | Kayama ............ 358/1.15 |

FOREIGN PATENT DOCUMENTS

JP  2000-118095 A  4/2000

* cited by examiner

*Primary Examiner* — Dov Popovici

(57) ABSTRACT

Print data is saved in a hot folder. The hot folder is a storage area for saving print data. Saving of print data in the hot folder is monitored at regular time intervals. Upon detecting saving of print data in the hot folder, the number of pages to be printed included in the print data is detected. If the number of pages to be printed is one page, an output layout is generated in accordance with a width of an output sheet. If the number of pages to be printed is two or more pages, an output layout in which the pages to be printed are arranged is generated. Then, the print data is registered as a print output job.

4 Claims, 2 Drawing Sheets

PRINT CONTROLLING APPARATUS AND METHOD OF CONTROLLING THE SAME

BACKGROUND OF THE INVENTION

1. Field of the Invention

The present invention relates to print controlling apparatuses that control output of printed materials.

2. Description of the Related Art

As a method for readily allowing printing of electronic data created on a personal computer (PC) according to predetermined print setting, use of a hot folder is known (e.g., Japanese Patent Laid-Open No. 2000-118095). A monitoring program is invoked to monitor the hot folder at regular time intervals. Upon input of print data to the hot folder, the print data is automatically registered as a job according to print setting set in advance for the hot folder.

Thus, the user can readily print desired electronic data simply by inputting the electronic data in the hot folder without having to make laborious print setting.

According to the related art, however, whether print data composed of a plurality of pages is inputted to the hot folder or print data composed of one page is inputted to the hot folder, only one layout can be used, so the layout is not flexible.

Furthermore, according to the related art, only one layout can be used regardless of the number of pages to be printed. Thus, if the user wishes to use different output layouts for printing depending on the number of pages, the user has to prepare hot folders individually for the output layouts. This causes an increase in the number of hot folders, and results in management complexity.

SUMMARY OF THE INVENTION

The present invention provides a print controlling apparatus that allows changing an output layout in accordance with the number of pages of print data saved in a hot folder, so that different layouts can be readily used for printing.

In one aspect of the present invention, a print controlling apparatus includes a data saving unit configured to save print data in a hot folder, where the hot folder is a storage area for saving print data, a monitoring unit configured to monitor saving of print data in the hot folder at regular time intervals, a number-of-pages detecting unit configured to detect the number of pages to be printed included in the print data, a layout generating unit configured to generate an output layout in accordance with a width of an output sheet when the number of pages to be printed is one page and to generate an output layout where pages included in the print data are arranged when the number of pages to be printed is greater than or equal to two, and a job registering unit configured to register the print data as a print output job.

Further features of the present invention will become apparent from the following description of exemplary embodiments with reference to the attached drawings.

DESCRIPTION OF THE EMBODIMENTS

Now, an embodiment of the present invention will be described.

Figure 1:
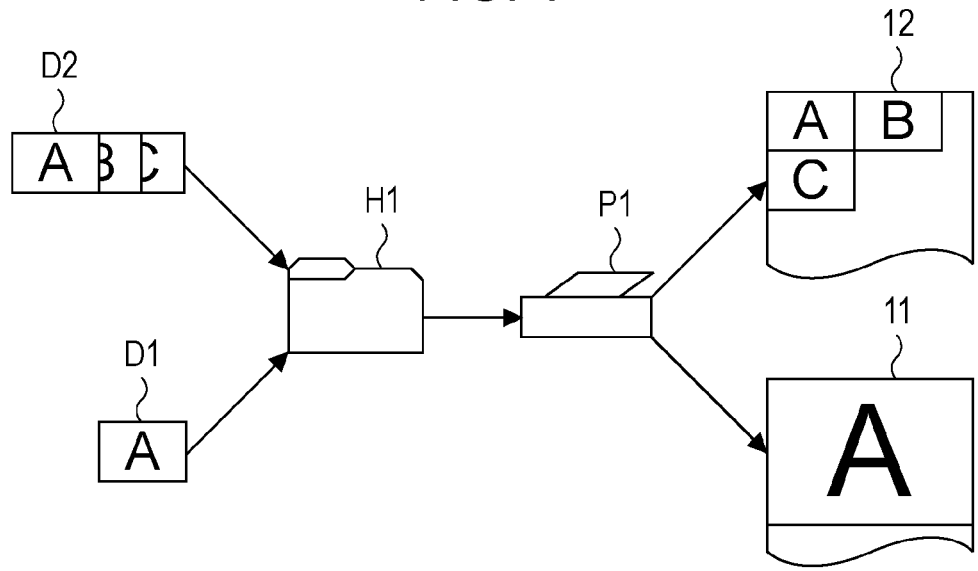
FIG. 1 is a diagram showing a manner of executing printing using a print controlling apparatus according to an embodiment of the present invention.

FIG. 1 is a diagram showing a manner of executing printing using a print controlling apparatus 100 according to an embodiment of the present invention.

Print data D1 is print data composed of one page. Print data D2 is print data composed of two or more pages. A printer P1 accepts registration of a job upon saving of print data in a hot folder H1. An output result 11 is a result that is output when the print data D1 composed of one page is saved in the hot folder H1. An output result 12 is a result that is output when the print data D2 composed of two or more pages is saved in the hot folder H1.

Figure 2:
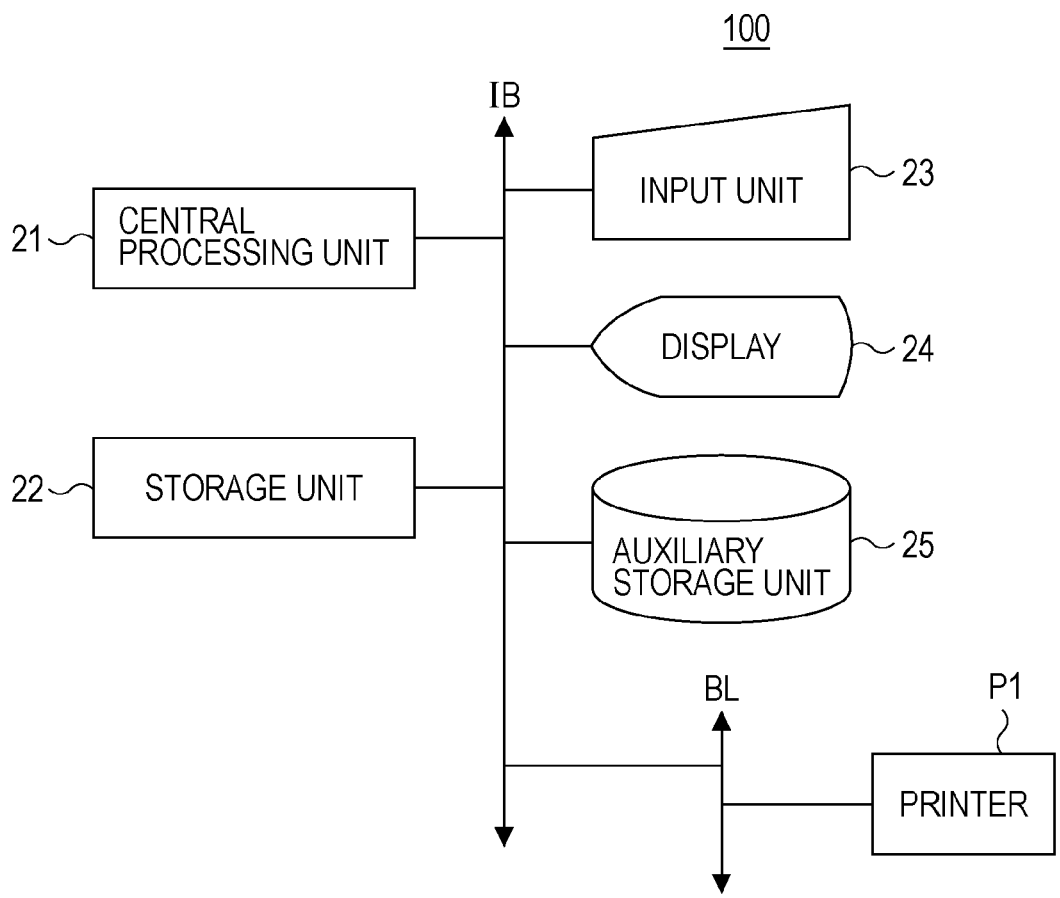
FIG. 2 is a block diagram showing an internal configuration of a PC including the print controlling apparatus according to the embodiment and connection of the PC with outside.

FIG. 2 is a block diagram showing the internal configuration of a PC including the print controlling apparatus 100 according to the embodiment, and connection of the PC with outside.

The PC includes a central processing unit (CPU) 21, a storage unit 22 such as a random access memory (RAM), an input unit 23 including a mouse, a keyboard, and so forth, a display 24 such as a cathode-ray-tube (CRT) display or a liquid crystal display (LCD), and an auxiliary storage unit 25 such as a hard disk or a magneto-optical disk. The components 21 to 25 of the PC are connected to each other via an internal bus line IB.

The storage unit 22 temporarily stores a monitoring program, a number-of-pages detecting program, an output-layout generating program, and a job-registration program, which will be described later. These programs are called by the CPU 21 as needed.

The input unit 23 allows a user to input various instructions, such as an instruction for creating the hot folder H1 or an instruction for saving print data in the hot folder H1.

The auxiliary storage unit 25 is a unit for saving print data.

The internal bus line IB of the PC is connected to the printer P1 via an external bus line BL, so that the PC can register a job in the printer P1.

That is, the storage unit 22 is an example of a data saving unit configured to save print data in a hot folder, which is a storage area for saving print data. The CPU 21 is an example of a monitoring unit that monitors saving of print data in the hot folder at regular time intervals, and is also an example of a number-of-pages detecting unit configured to detect, upon the monitoring unit detecting saving of print data in the hot folder, the number of pages to be printed included in the print data. Furthermore, the CPU 21 is also an example of a layout generating unit. The layout generating unit generates an output layout in accordance with a width of an output sheet in a case where the number of pages to be printed, detected by the number-of-pages detecting unit, is one page, and generates an output layout in which the pages of the print data are arranged in a case where the number of pages to be printed, detected by the number-of-pages detecting unit, is two or more pages. The storage unit 22 is an example of a job registering unit configured to register print data as a print output job.

Next, an operation of the print controlling apparatus 100 will be described.

Figure 3:
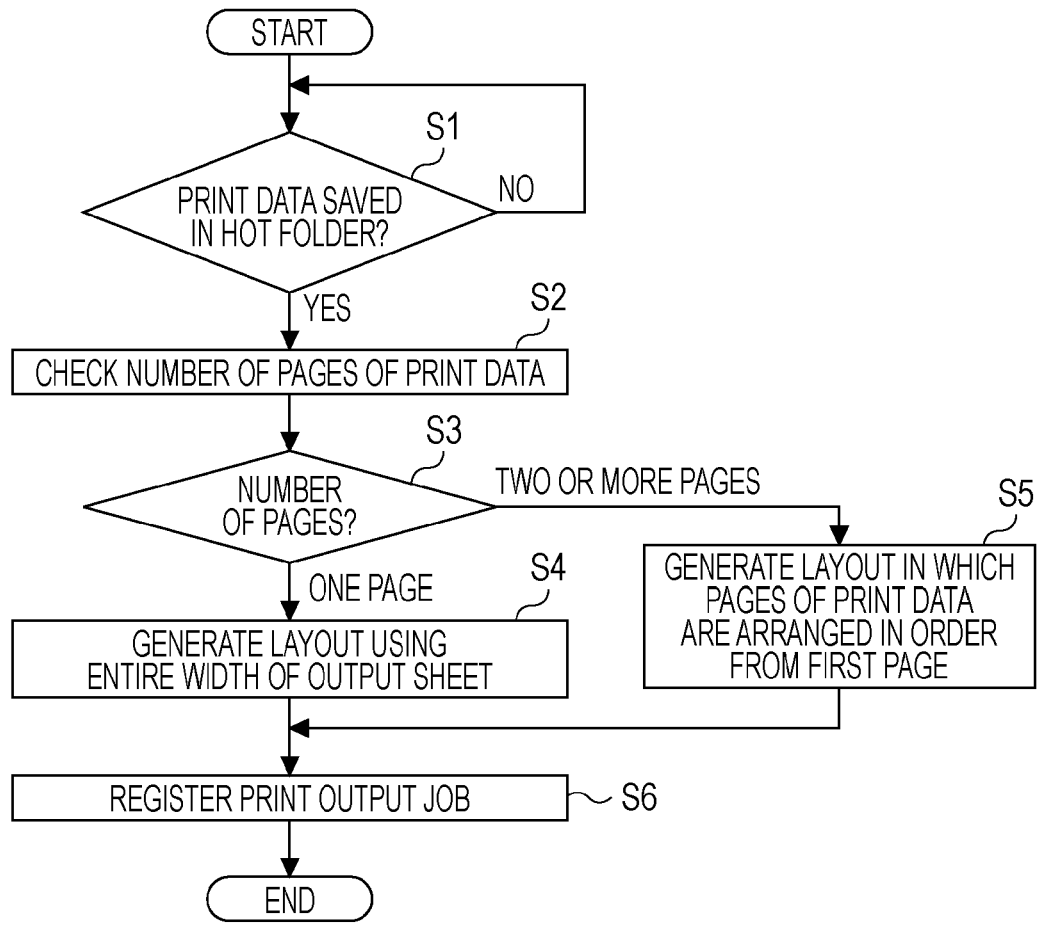
FIG. 3 is a flowchart showing a process executed according to a print controlling program for controlling the operation of the print controlling apparatus according to the embodiment.

FIG. 3 is a flowchart showing a process that is executed according to a print controlling program for controlling the operation of the print controlling apparatus 100.

It is assumed herein that the hot folder H1 has been created on the PC.

Upon invocation of the print controlling program, a monitoring program is activated. Then, the monitoring program monitors at regular time intervals whether print data has been saved in the hot folder H1 created by the user in advance (S1). The user may be allowed to set or change the time intervals for monitoring of the hot folder H1 by the monitoring program.

Then, when the user has saved print data in the hot folder H1 and the monitoring program has detected the saving of the print data, the print controlling program invokes a number-of-pages detecting program. The number-of-pages detecting program checks the number of pages of the print data, and returns information representing the number of pages to the print controlling program (S2).

Upon receiving the information representing the number of pages, the print controlling program invokes an output-layout generating program by passing the information representing the number of pages included in the print data.

The output-layout generating program first selects a process that is to be executed according to the number of pages (S3).

In a case where the number of pages to be printed is one page, the output-layout generating program generates a layout in accordance with a width of an output sheet provided in the printer P1 so that the print data is printed using the full width of the output sheet (S4).

On the other hand, in a case where the number of pages to be printed is two or more pages, the output-layout generating program generates a layout in which the pages of the print data are arranged in order from the first page so that the pages will be accommodated in a width of an output sheet provided in the printer P1 (S5).

When an output layout has been generated, the print controlling program invokes a job registering program for registering a print output job. The job registering program registers a job for the print data in the printer P1 according to the output layout generated by the output-layout generating program (S6).

Now, for example, let it be supposed here that data of one picture is saved in the hot folder H1 as print data (corresponding to the print data D1). In this case, since the print data is composed of one page, according to the process shown in the flowchart, the printer P1 outputs the output result 11, in which the print data is laid out using a full width of an output sheet.

As another example, let it be supposed that a document composed of three pages of the A4 size (corresponding to the print data D2) is saved in the hot folder H1 as print data. In this case, since the print data is composed of two or more pages, according to the process shown in the flowchart, the printer P1 outputs the output result 12, in which the pages of the document are arranged.

Furthermore, in the case where the print data is composed of two or more pages, in step S5, the output-layout generating program may invoke another application that allows editing of the arrangement of the pages so that the user can edit the arrangement of pages as desired.

Figure 4:
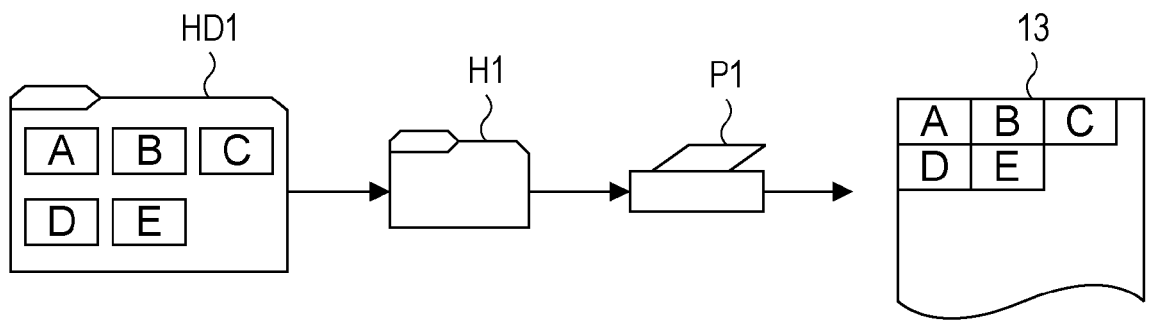
FIG. 4 is a diagram showing a manner of executing printing in a case where a folder storing a plurality of pieces of print data is saved in a hot folder in the print controlling apparatus according to the embodiment.

FIG. 4 is a diagram showing a manner of executing printing in a case where a folder HD1 storing a plurality of pieces of print data is saved in the hot folder H1 in the print controlling apparatus 100.

In a case where the print data detected in step S1 is the folder HD1, it is possible to check the total number of pages of print data existing in the folder HD1 in step S2, and to switch a process that is to be executed according to the total number of pages in step S3.

In this case, for example, assuming that data of five pictures is stored in the folder HD1 and the folder HD1 is saved in the hot folder H1, it is detected in step S1 that the folder HD1 has been saved in the hot folder H1, and the total number of print data stored in the folder HD1 is checked in step S2. Since it is detected that the print data is composed of five pages, the procedure proceeds to step S5, in which an output layout is generated in which data of the five pictures are arranged as print data composed of five pages, and a job is registered in step S6. Then, an output result 13 having a layout in which the image data of the five pictures is arranged is obtained.

In this embodiment, the layout generating unit can invoke another setting application that allows the user to change as desired the arrangement of pages in a case where the number of pages to be printed is two or more pages. In a case where a folder storing one or more pieces of print data is saved in the hot folder, the number-of-pages detecting unit detects the total number of pages of print data existing in the folder storing the print data. The layout generating unit generates an output layout in accordance with a width of an output sheet in a case where the total number of pages existing in the folder storing the print data is one page, and generates an output layout in which the pages of the print data are arranged in a case where the total number of pages is two or more pages.

The embodiment described above can also be recognized as embodying a method according to an aspect of the present invention. That is, the embodiment includes a data saving step of saving print data in a hot folder, which is a storage area for saving print data, and a monitoring step of monitoring saving of print data in the hot folder at regular time intervals. Furthermore, the embodiment includes a number-of-pages detecting step, upon detection of saving of the print data in the hot folder in the monitoring step, the number of pages to be printed included in the print data, and storing the number of pages in a storage unit. Furthermore, the embodiment includes a layout generating step. In the layout generating step, if the number of pages to be printed is detected in the number-of-pages detecting step as one page, an output layout is generated in accordance with the width of an output sheet, and the output layout is stored in the storage unit. On the other hand, in a case where the number of pages to be printed is two or more as detected in the number-of-pages detecting step, an output layout is generated where the pages of the print data are appropriately arranged, and the output layout is stored in the storage unit. Furthermore, the embodiment includes a job registering step of registering the print data as a print output job.

According to the present invention, since the output layout is switched according to the number of pages of print data saved in the hot folder, it is possible to execute printing using different layouts. This serves to improve convenience for printing executed by a user.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-076403 filed Mar. 23, 2007, which is hereby incorporated by reference herein in its entirety.

What is claimed is:

1. A print controlling apparatus comprising:
a detecting unit configured to detect that print data is input in a hot folder;
a determining unit configured to determine, in a case where the detecting unit detects that the print data is input in the hot folder, a number of pages to be printed included in the print data input in the hot folder;
a generating unit configured to generate an output layout of the print data input in the hot folder depending on whether the number of pages to be printed is one page or greater than or equal to two; and
a print control unit configured to cause a printer to print the print data input in the hot folder on a printing medium in accordance with the output layout generated by the generating unit,
wherein the generating unit generates the output layout for one page, in a case where the number of pages to be printed is one page, such that the print data of one page is fitted to a width of the printing medium and generates the output layout for plural pages, in a case where the number of pages to be printed is greater than or equal two, such that plural pages included in the print data are arranged in the width of the printing medium.

2. The print controlling apparatus according to claim 1, wherein the generating unit allows a user to determine arrangement of pages as desired if the number of pages to be printed is greater than or equal to two.

3. The print controlling apparatus according to claim 1,
wherein, in a case where one or more pieces of print data is input in the hot folder, the determining unit determines a total number of pages of the print data existing in the hot folder, and
wherein the generating unit generates the output layout depending on the total number of pages of the print data determined by the determining unit.

4. A printing method comprising:
detecting that print data is input in a hot folder;
determining, in a case where it is detected that the print data is input in the hot folder, a number of pages to be printed included in the print data input in the hot folder;
generating an output layout of the print data input in the hot folder depending on whether the number of pages to be printed is one page or greater than or equal to two; and
causing a printer to print the print data input in the hot folder on a printing medium in accordance with the generated output layout,
wherein, in a case where the number of pages to be printed is one page, the output layout for one page is generated such that the print data of one page is fitted to a width of the printing medium and, in a case where the number of pages to be printed is greater than or equal two, the output layout for plural pages is generated such that plural pages included in the print data are arranged in the width of the printing medium.

* * * * *